(12) United States Patent
Kumar et al.

(10) Patent No.: US 10,474,954 B2
(45) Date of Patent: Nov. 12, 2019

(54) FEEDBACK AND CUSTOMIZATION IN EXPERT SYSTEMS FOR ANOMALY PREDICTION

(71) Applicants: Preetdeep Kumar, Bettiah (IN); Rashmi Gupta, Sunnyvale, CA (US); Shweta Tiwari, Gujarat (IN); Steven L. Greenspan, Scotch Plains, NJ (US); Serguei Mankovskii, Morgan Hill, CA (US)

(72) Inventors: Preetdeep Kumar, Bettiah (IN); Rashmi Gupta, Sunnyvale, CA (US); Shweta Tiwari, Gujarat (IN); Steven L. Greenspan, Scotch Plains, NJ (US); Serguei Mankovskii, Morgan Hill, CA (US)

(73) Assignee: CA, Inc., New York, NY (US)

(*) Notice: Subject to any disclaimer, the term of this patent is extended or adjusted under 35 U.S.C. 154(b) by 1143 days.

(21) Appl. No.: 14/753,341

(22) Filed: Jun. 29, 2015

(65) Prior Publication Data

US 2016/0379119 A1 Dec. 29, 2016

(51) Int. Cl.
*G06N 5/02* (2006.01)
*G06F 11/00* (2006.01)
*G06F 11/34* (2006.01)

(52) U.S. Cl.
CPC .......... *G06N 5/025* (2013.01); *G06F 11/008* (2013.01); *G06F 11/34* (2013.01)

(58) Field of Classification Search
CPC ........ G06N 5/025; G06F 11/008; G06F 11/34
(Continued)

(56) References Cited

U.S. PATENT DOCUMENTS 8,032,535 B2 10/2011 Strehl
2001/0021914 A1\* 9/2001 Jacobi et al. ........... G06F 17/60
705/8

(Continued)

OTHER PUBLICATIONS

Gu et al., Online Anomaly Prediction for Robust Cluster Systems, IEEE International Conference on Data Engineering (ICDE), Shanghai, China, Apr. 2009, available at http://dance.csc.ncsu.edu/papers/icde09-xhhx.pdf (retrieved Nov. 13, 2015).

(Continued)

*Primary Examiner* — Robert A Cassity
*Assistant Examiner* — Ababacar Seck
(74) *Attorney, Agent, or Firm* — Baker Botts L.L.P.

(57) ABSTRACT

Systems and methods may include receiving, by an expert system, performance data for a monitored system. The systems and methods may include generating a prediction for the monitored system in response to determining that the performance data satisfies a condition. The prediction may identify an anomaly that is predicted to occur. The systems and methods may include receiving, by a filter system, the prediction, information identifying the condition, and user information. The user information may include user preference information and user feedback information. The systems and methods may include determining a filter criteria based on the user information. The filter criteria may be based on the preferences for predictions to be provided to the user and on the historical user feedback regarding the historical predictions. The systems and methods may include providing the prediction to the user in response to determining that the particular prediction satisfies the filter criteria.

20 Claims, 6 Drawing Sheets

(58) Field of Classification Search
USPC .......................................................... 706/46
See application file for complete search history.

(56) References Cited

U.S. PATENT DOCUMENTS

| | | | |
|---|---|---|---|
| 2002/0161664 A1* | 10/2002 | Shaya ..................... | G06F 17/60 |
| | | | 705/26 |
| 2006/0036560 A1* | 2/2006 | Fogel ..................... | G06F 15/18 |
| | | | 706/45 |
| 2010/0169313 A1* | 7/2010 | Kenedy et al. .......... | G06F 7/06 |
| | | | 707/736 |

OTHER PUBLICATIONS

Tan et al., On Predictability of System Anomalies in Real World, IEEE/ACM International Symposium on Modeling, Analysis and Simulation of Computer and Telecommunication Systems (MASCOTS), Miami Beach, Florida, Aug. 2010, available at http://dance.csc.ncsu.edu/papers/mascots10-prediction.pdf (retrieved Nov. 13, 2015).

Ren et al., LogMaster: Mining Event Correlations in Logs of Large-Scale Cluster Systems, dated Jan. 15, 2013, available at http://arxiv.org/pdf/1003.0951.pdf (retrieved Nov. 13, 2015).

* cited by examiner

FEEDBACK AND CUSTOMIZATION IN EXPERT SYSTEMS FOR ANOMALY PREDICTION

BACKGROUND

The present disclosure relates to anomaly prediction and, more specifically, to systems and methods for feedback and customization in expert systems for anomaly prediction.

Expert systems are generally computer-implemented systems that simulate the judgment and behavior of a human or an organization, which has expert knowledge and experience in one or more particular fields. Typical expert systems are built from a complex collection of if-then rules based on expert knowledge in such fields.

Current systems for anomaly prediction from log files are mostly focused on mining system log files. Certain key metrics (e.g., CPU usage, memory used, memory free) are identified in the log files generated from a monitoring application, and the values of such metrics are used to detect the current state of the system (e.g., the system is busy, the network is slow, a packet dropping rate) and to forecast information about the system (e.g., disk consumption). In current systems, the values of such metrics are provided to an expert system, which uses the metric values to predict the occurrence of anomalies.

BRIEF SUMMARY

According to an aspect of the present disclosure, a method may include several processes. In particular, the method may include receiving, by an expert system, performance data for a monitored system. The expert system may store rules. Further, the method may include generating, by the expert system, a particular prediction for the monitored system in response to determining that the performance data satisfies a condition. The particular prediction may identify an anomaly that is predicted to occur. The condition may include a rule from the rules. Moreover, the method may include receiving, by a filter system, the particular prediction, information identifying the condition, and user information. The user information may include user preference information and user feedback information. The user preference information may identify preferences for predictions to be provided to the user. The user feedback information may identify historical user feedback regarding historical predictions. In addition, the method may include determining, by the filter system, a filter criteria based on the user information. The filter criteria may be based on the preferences for predictions to be provided to the user and on the historical user feedback regarding the historical predictions. Also, the method may include providing the particular prediction to the user in response to determining that the particular prediction satisfies the filter criteria.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure management, systems and methods disclosed herein may be related to other areas beyond network infrastructure. Systems and methods disclosed herein may be related to, and used by, any predictive system that utilizes expert learning or other predictive methods. Systems and methods disclosed herein may be applicable to a broad range of applications that, such as, for example, research activities (e.g., research and design, development, collaboration), commercial activities (e.g., sales, advertising, financial evaluation and modeling, inventory control, asset logistics and scheduling). IT systems (e.g., computing systems, cloud computing, network access, security, service provisioning), medicine (e.g., diagnosis or prediction within a particular specialty or sub-specialty), and other activities of importance to a user or organization.

Although anomaly detection has been an active area of research, lesser attention has been received by anomaly prediction. For example, in methods of anomaly detection, a model is built over the normal data and then a check is made to see how well live data fits this model. In contrast, methods for anomaly prediction may involve identifying pre-anomaly symptoms and providing an alert in advance for future data before an anomaly actually happens and system goes in anomalous state.

Existing methods of using an expert system for anomaly prediction using a log file generally make predictions in one way and are not reactive or proactive to user, who may be one or more persons that install, configure, and/or use such an anomaly prediction system. The lack of user feedback or ability to personalize prediction limits the capabilities of such systems to adapt to different environments. In particular, expert systems for anomaly prediction generally lack support for user feedback and customization of prediction models, which restricts learning to training and testing environments that utilize labeled data only. Existing expert systems generally provide a set of predefined predictions, but the prediction model for such systems may not be customized based on user preferences, and such systems may not be used to provide customized predictions that are tailored to the desires and needs of specific users.

In view of the foregoing, a need has arisen for ways for expert systems to continuously accept feedback and to allow self-customization such that the predictor model provides tailored predictions that are more accurate, valid, useful, and meaningful for each user.

Systems and methods disclosed herein may provide a way to continuously accept feedback from users while the expert system is in a production environment and may permit the system to dynamically adjust to each user's requirements. In particular, these requirements may be different for different users and thus a single model may not give better results for all.

Users often are not subject matter experts for the software application for which an anomaly prediction system is created. Accordingly, users are generally presented with a prediction of when an anomaly will occur, which may include a priority of the anomaly, a result of the anomaly, and a probable solution or action to address or avoid the anomaly. Systems and methods disclosed herein may permit users to customize the prediction of an expert system based on such users' requirements. For example, each of a plurality of users may have its own customization, which may be learned from a history of past behavior or which may be chosen from a list of recommended customizations. In some implementations, all of the users within a group of users having similar attributes or a similar history of behavior may have the same or similar customizations. In certain implementations, users may not modify patterns and rules utilized by the expert system directly, but rather may modify one or more of the type, amount, and/or content of information fed into the expert system and the type and/or content of predictions presented to each user.

Figure 1:
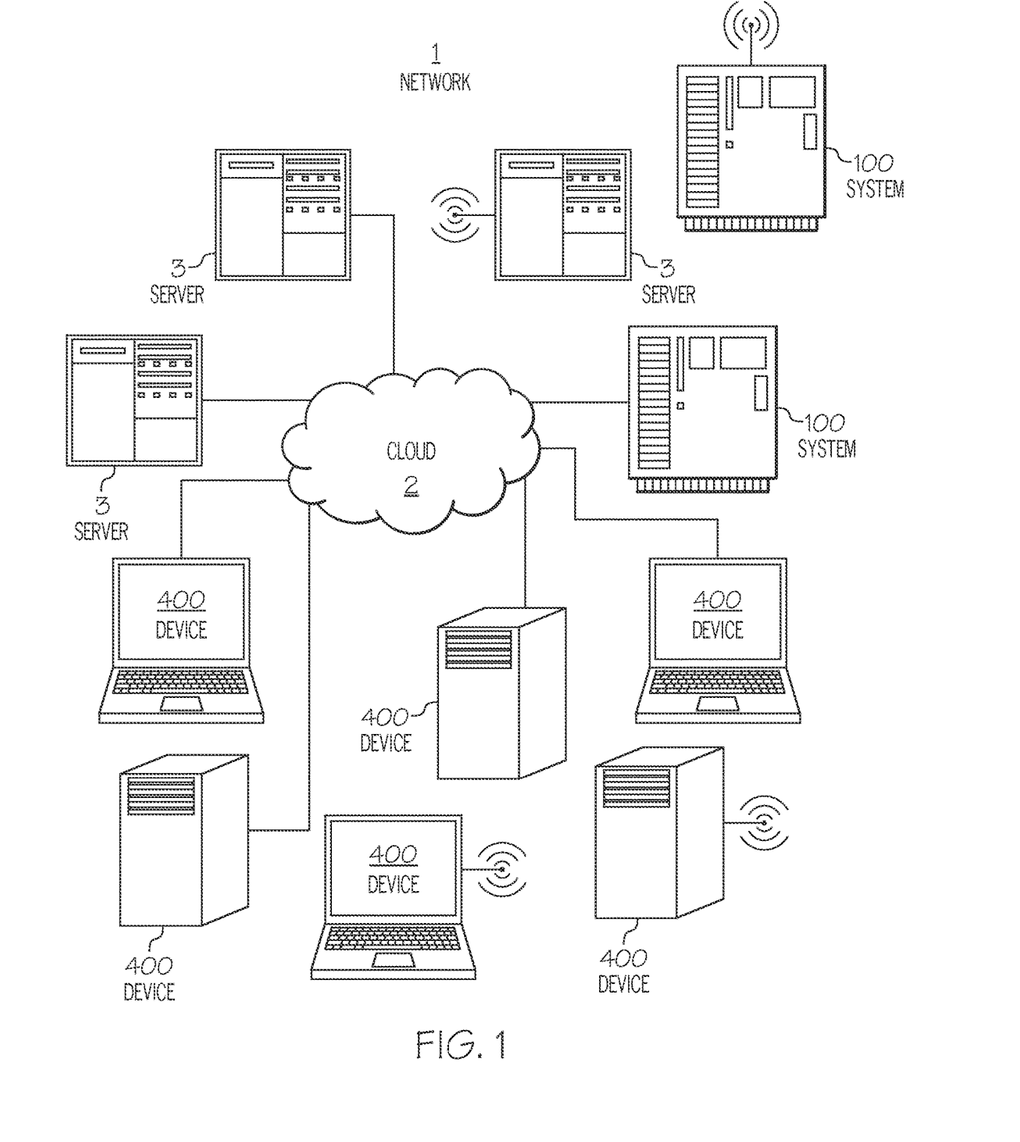
FIG. 1 is a schematic representation of a network 1 on which systems and methods for feedback and customization in expert systems for anomaly prediction may be implemented.

Referring now to FIG. 1, a network 1 for service providers and consumers of provided services now is described. Network 1 may comprise one or more clouds 2, which may be public clouds, private clouds, or community clouds. Each cloud 2 may permit the exchange of information and services between information providers, service providers, consumers of provided information, consumers of provided services, and brokers that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications between information providers, service providers, consumers of provided information, consumers of provided services, and brokers.

Network 1 may comprise one or more servers 3 and other devices operated by one or more service providers. Network 1 also may comprise one or more devices 400 utilized by one or more consumers of provided services. The one or more service providers may provide services to the one or more consumers utilizing the one or more servers 3, which connect to the one or more devices 400 via cloud 2. The services may comprise, for example, information technology services, financial services, business services, access services, and other resource-provisioning services. Servers 3 may comprise, for example, one or more of general purpose computing devices, specialized computing devices, mainframe devices, wired devices, wireless devices, and other devices configured to provide services to consumers. Devices 400 may comprise, for example, one or more of general purpose computing devices, specialized computing devices, mobile devices, wired devices, wireless devices, passive devices, routers, switches, and other devices utilized by consumers of provided services.

Moreover, network 1 may comprise one or more system 100 that may monitor and collect data regarding the usage of infrastructure in network 1 (e.g., the utilization and provisioning of resources), may analyze such data and develop and/or refine predictive models regarding the usage of infrastructure in network 1, may apply such predictive models to the collected data, and may proactively allocate resources within network 1 to intelligently manage network capacity. System 100 may be, for example, one or more of a general purpose computing device, a specialized computing device, a wired device, a wireless device, and any other device configured to proactively optimize services provided by the one or more service providers to the one or more consumers. System 100 may connect to cloud 2 and monitor servers 3 and the services available from the one or more service providers. System 100 also may monitor devices 400 and the services provided to the one or more consumers of provided services via cloud 2. By monitoring the one or more service providers and the one or more consumers, system 100 may generate rich datasets regarding available services and consumption patterns, comprising lists of available services, quality information about the available services, and consumer preferences for certain services. System 100 may utilize these data sets to determine correlations in resource utilization and to intelligently build predictive models for future utilization based on present behavior. In this manner, system 100 may proactively allocate network resources based on current resource usage and predicted future utilization.

In some configurations, one or more of a server 3 operated by a service provider and a device 400 operated by a consumer may comprise system 100. In other configurations, system 100 may be separate from servers 3 and devices 400. In certain configurations, system 100 may be operated by a party other than a service provider or a consumer of provided services.

Figure 2:
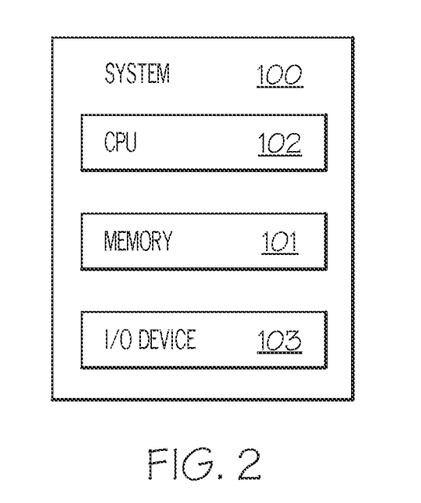
FIG. 2 is a schematic representation of a system configured to provide feedback and customization in expert systems for anomaly prediction.

Referring now to FIG. 2, processing system 100, which may be configured to implement feedback and customization in expert systems for anomaly prediction, now is described. System 100 may comprise a memory 101, a CPU 102, and an input and output ("I/O") device 103 and may be configured to implement an expert system and other comparable predictive systems. Memory 101 may store computer-readable instructions that may instruct system 100 to perform certain processes. I/O device 103 may transmit data to/from cloud 2 and may transmit data to/from other devices connected to system 100. Further, I/O device 103 may implement one or more of wireless and wired communication between system 100 and other devices.

Figure 3:
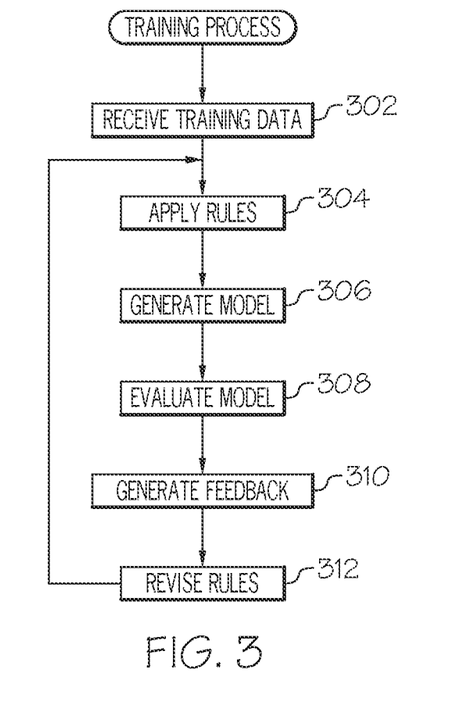
FIG. 3 illustrates a training process for training an expert system.

Referring now to FIG. 3, a training process for training an expert system now is described. In the training process, system 100 may receive well-understood training data and may use such data to develop and refine complex models of the infrastructure of network 1 or any other system being investigated and/or monitored.

In S302, system 100 may receive training data. Such training data may include well-understood data sets that may simulate the subject matter to be analyzed by an expert system. For example, the training data may include model data that simulates the performance of components within a network and the infrastructure that connects such components (e.g., latency, processor utilization, memory utilization, bandwidth, temperature, humidity, users, jobs, services provided). System 100 may store an expert rule base in memory 101 or other memory. The rule base may include numerous rules that have been programmed into system 100 and that represent expert knowledge of the relevant fields being investigated. In S304, system 100 may apply the rules stored therein to the received training data. Based on the applied rules, system 100 may generate a model representation of the system being studied by the expert system. For example, system 100 may generate a model of a particular network based on the applied rules and training data associated with the particular network.

When the training data is well-understood, the actual performance of the system corresponding to the training data may be known. For example, the training data may represent the performance of a system leading up to a component failure, in which case it may be known that the system ultimately will fail. Consequently, in S308, system 100 may compare the model generated in S306 with the actual behavior of the system on which the training data is based. In this manner, system 100 may evaluate the accuracy of the generated model.

In S310, based on the differences between the performance characteristics of the model generated in S306 and the actual behavior of the system, system 100 may generate feedback that may be used to alter the rule base stored in memory 101. For example, system 100 may learn that new rules are needed, that some rules need to be eliminated, and that other rules need to be altered, for example, to account for the behavior of the training data. Thereafter, based on the feedback generated in S310, system 100 may proceed to S312 and revise the rules, such that the rules produce a better model of the system being investigated. At this point, system 100 may return to S304 and apply the revised rules to the training data. In some configurations, this may be the previously-used training data. In other configurations, this may be newly-received training data. Consequently, by implementing the process shown in FIG. 3, system 100 may train the expert system and build and/or refine the complex set of rules governing such expert system.

Figure 4:
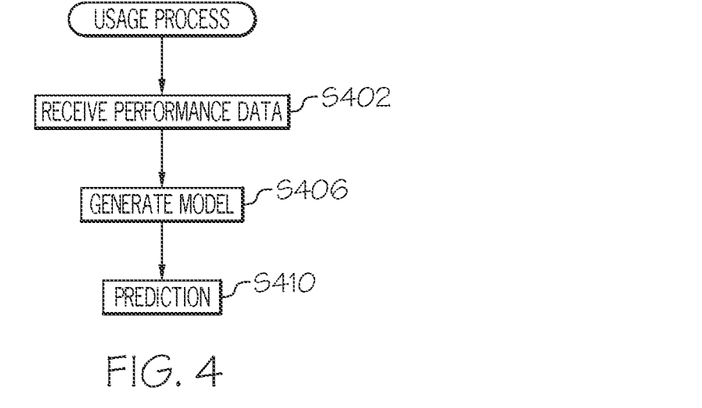
FIG. 4 illustrates a usage process for an expert system.

Referring now to FIG. 4, a usage process for an expert system now is described. In the usage process, system 100 may receive performance data from components and other infrastructure within a network operating in a real-world environment. For example, system 100 may obtain such information about network 1 by using one or more probes or other components to collect data from network 1. In some configurations, the performance data may include log files from one or more components within a network, for example. Thereafter, system 100 may apply the rules within the expert system to the received performance data and generate models of the system based thereon. Such models may be used to predict the future behavior of the system, such as the occurrence of an anomalies, which may include component failures, lagging, over-utilization, burnout, and other malfunctions. The usage process of FIG. 4 may be conceptually similar to the training process of FIG. 3, except that the rule base of the expert system is not modified during the usage process (e.g., when the expert system is "in production").

In S402, system 100 may receive performance data from the system being investigated. For example, system 100 may receive as performance data information about the components and infrastructure within network 1. In S406, system 100 may apply the rules of the expert system and generate a model. S406 may be substantially similar to S306, for example. Continuing the example above, the model generated in S406 may be a model of all of the components and infrastructure within network 1 at some point in the future. In S410, system 100 may analyze the model generated in S406 and generate predictions about the future behavior of network 1 and the components and other infrastructure within network 1. For example, if the model predicts a high latency in a particular region of network 1, system 100 may predict that a switch or other network component within that region is likely to fail.

Figure 5:
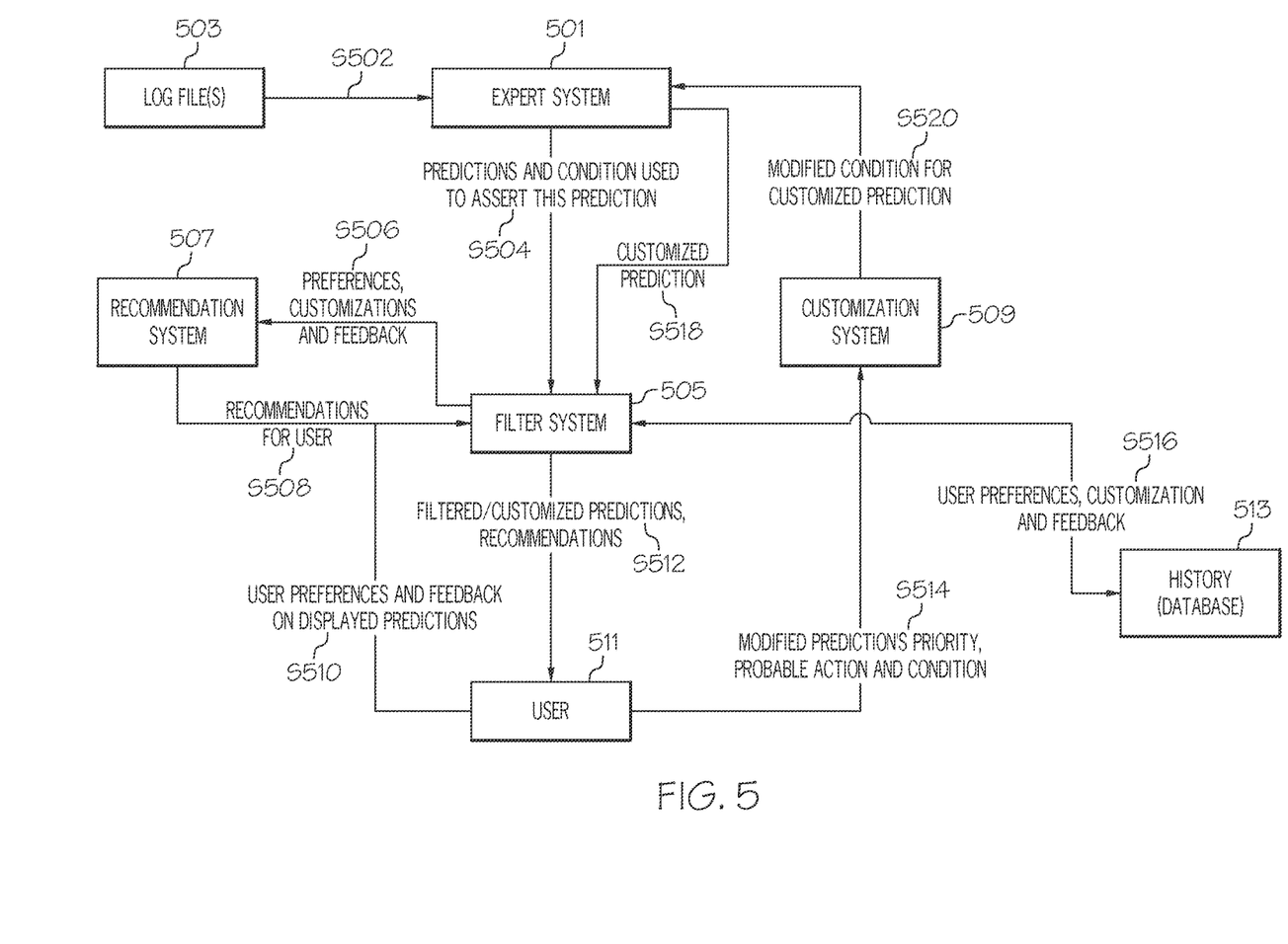
FIG. 5 illustrates a representative system and process for feedback and customization in expert systems for anomaly prediction.

Referring now to FIG. 5, a system and process for feedback and customization in expert systems for anomaly prediction now is described. In some implementations, system 100 may implement an expert system 501, a filter system 505, a recommendation system 507, a customization system 509, and a history (e.g., database) 513. In other implementations, one or more of expert system 501, filter system 505, recommendation system 507, customization system 509, and history 513 may be implemented by a system other than system 100.

In S502, expert system 501 may receive one or more log files, which may contain performance information about one or more components within a network. Expert system 501 may thus act as a black box and perform processes similar to those described above with respect to FIG. 4 and may generate a prediction for the future behavior of the network. In S504, expert system 501 may provide information about the prediction and the performance information, which may include the prediction and the performance data themselves, to filter system 505.

Filter system 505 may function to filter information received from expert system 501 and customization system 509 based on known information about user 511 and/or information about user 511 received from recommendation system 507. After filtering and/or otherwise processing such information, filter system 505 may provide filtered and/or customized predictions and recommendations about the system being investigated to user 511 in S512.

Upon receiving predictions and/or recommendations from filter system 505, system 100 (or another terminal capable of providing such information to user 511) may present user 511 with an option to provide feedback, preferences, priorities, and/or other relevant information thereto. In some implementations, user 511 may be presented with such option even before receiving recommendations and/or predictions. In certain implementations, system 100 may monitor how user 511 interacts with the predictions and/or recommendations from filter system 505 and actively learn user 511's preferences. For example, system 100 may learn whether a modified/customized prediction was important or otherwise useful to user 511. System 100 may also permit user 511 to provide additional information and/or insight, such as the probability of an anomaly, likely reasons for an anomaly, and the importance of an anomaly, for example, which may further refine the prediction.

More particularly, in S510, information collected about user 511's preferences on predictions provided in S512 and user 511's feedback about such predictions may be provided to filter system 505. Consequently, filter system 505 may use such information and feedback to directly filter predictions provided by expert system 501, such that user 511 receives predictions tailored to user 511's preferences. In S506, filter system 505 may provide the user preferences and feedback, which were received in S510 and S516 (described below), and the user customizations, which were received in S518 and S516 (both described below), to recommendation system 507 for processing thereby. In S508, recommendation system 507 may analyze the user preferences, feedback, and customizations to generate a recommendation for filtering tailored to user 511. Recommendation system 507 may provide such recommendation to filter system 505, which filter system 505 may use to filter predictions received from expert system 501.

In S514, user 511 may provide additional information and/or insight, such as the probability of an anomaly, likely reasons for an anomaly, and the importance of an anomaly, for example, to customization system 509. Further, such additional information may also indicate that user 511 considers certain information low priority. For example, user 511 may indicate that CPU utilization is not a priority consideration. Customization system 509 may determine that certain performance information (e.g., from log files) is less important based on the additional information provided by user 511. Consequently, in S520, customization system 509 may control what performance information is provided to expert system 501, such that the prediction produced by expert system 501 may be modified (e.g., during the usage process) without changing the rule base of expert system 501 (e.g., without initiating a training process). In some implementations, customization system 509 also may transmit information about the customization (e.g., additional and/or modified conditions, modified priority information, modified actions, modified performance data) to filter system 505. Thus, in S518, expert system 501 may provide a customized prediction, which may be tailored to the preferences of user 511, to filter system 505.

Filter system also may receive user preferences, customizations, and feedback from a history 513 (e.g., a database such as a memory) in S516. Such user preferences, customizations, and feedback may be specific to user 511 or may be a collection of user preferences, customizations, and feedback from a plurality of users. In some implementations, such user preferences, customizations, and feedback may be a collection of user preferences, customizations, and feedback from users having similar attributes (e.g., historical behaviors, group affiliations, roles, authority, access rights) to user 511. Filter system 505 may use such user preferences, customizations, and feedback may to further tailor the predictions provided to user 511. History 513 may store a history of user preferences, customizations, and feedback and function as a database for rich sets of data. Moreover, filter system 505 may provide user preferences, customizations, and feedback received thereby (e.g., in S504, S508, and S518) to history 513 for storage.

In some implementations, filter system 505 may receive feedback when user 511 is installing and/or configuring system 100 or any other system that implements one or more of components 501, 505, 507, 509, and 513. Thereafter, filter system 505 may apply such feedback to incoming predictions from expert system 501.

In some implementations, filter system 505 may receive feedback when the predictions are shown to user 511 in the form of acknowledgement from user or based on modified probable actions. Filter system 505 may subsequently to such information to recommendation system 507 to compile recommendations for user 511 or a new user who might be similar to user 511 and might have similar preferences. Consequently, this may enable the formation of groups.

In some implementations, customization system 509 may allow customization for the priority of a prediction and may effectively function in a manner similar to adding and/or deleting rules from expert system 501. Customization system 509 may effectively pre-filter predictions based on the priorities of user 511 and thereafter may send such pre-filtered predictions to filter system 505 (e.g., directly without sending to expert system 501). In implementations where it is desirable to function in a manner similar to adding and/or deleting rules from expert system 501, recommendation system 509 may modify the performance data to eliminate and/or add the effects of such rules.

In some implementations, when a new user starts using the system shown in FIG. 5, the system may check if one or more similar user exists and, if one or more similar user does exist, the system may present to the new user a set of recommendations and/or preferences for that group. The new user than may determine whether such preferences and/or recommendations are appropriate.

In some implementations, expert system 501 may generate anomaly predictions based on a defined set of rules. Each prediction may include at least the following attributes: (1) a unique identifier or name; (2) a priority level or value; (3) identification of the rules used to assert the prediction; (4) a result (e.g., text or graphics shown to the user when the prediction occurs); and (5) identification of probable solution and/or actions that may be executed by the user to avoid or troubleshoot this anomaly). As shown in FIG. 5, expert system 501 may be expanded by adding a feedback mechanism (e.g., components 505, 507, 509, and 513) to make predictions more useful and to provide the ability to customize the predictions for users 511 based on their preferences or recommendations.

Certain implementations of systems and methods disclosed herein may enable user feedback and apply such feedback in different ways to derive useful predictions.

One aspect of certain systems and methods disclosed herein may be providing an option for a user to provide feedback to the expert system. For example, at the time of initial set up, systems and methods disclosed herein may provide users with an option to select different sets of preferences to filter results that such users are looking for or that such users are more interested in. For example, systems and methods may permit users to define, and may filter predictions based on, one or more of: (1) priority of the information and/or prediction; (2) whether an event and/or prediction occurs greater than x % (where x is determined from the user) of the time; (3) top N predictions based on occurrence or priority of predictions; (4) recommendations based on historical data; and (5) user predictions, for example. Such preferences may be stored in a memory (e.g., memory 101 or another memory) and may be feed to filter system 505. Filter system 505 may apply such feedback to the predictions coming from expert system and only the filtered predictions may be sent to user 511.

For example, if user 511 chooses two predictions out of a list of predictions, system 100 (or any other system implementing the systems and methods of FIG. 5) may determine that user 511 is interested in only two predictions, and filter system 505 may filter out the other predictions from the list presented to the user.

As another example, while predictions are occurring and presented to user 511, user 511 may mark such predictions as one or more of useful, not useful, accurate, inaccurate, or not valid. This on-the-fly feedback may be used by filter system 505 and recommendation system 507 to update the predictions and/or generate recommendations for similar users.

For example, an anomaly may be predicted. The prediction may indicate that "a certain server will be slow in next 'T' time units." This prediction may be both valid and useful if that server is a web server, load balancer, or virtual router, but the prediction may not be useful when the server is a backup server. Consequently, systems and methods disclosed herein may dynamically update themselves, based on feedback, to ignore this prediction if the device is a backup server.

An aspect of some systems and methods disclosed herein may be a self-learning component. Such learning may occur through one or more of recommendations and user-clustering, for example. Using a recommendation approach to self-learning, recommendation system 507 may compile groups of predictions that have been recommended or customized similarly and may provide predictions within a group together. For example, if a prediction is selected as useful, filter system 505 may selectively provide user 511 with other predictions that were marked as useful by user 511 or other users. Using a user-clustering approach, recommendation system 507 and/or customization system 509 may establish groups of users with similar preferences or that make similar customizations. Consequently, new users can be readily classified into a group and may be presented with preferences or customizations associated with the group.

An aspect of particular systems and methods disclosed herein may be customized predictors. In particular, systems and methods disclosed herein may customize predictions based on certain attributes, such as a prediction's priority, a prediction's probable solution or required ameliorative action, or a condition (e.g., performance data from a log file) used to generate a prediction. Such systems and methods may allow for customization of the predictor model in a manner that makes predictions more meaningful not only to a particular user but, in some implementations, also to a specific group of users. This may provide an efficient and effective way to change the model itself and may allow the model to adapt itself based on the requirements of different users.

An example of a process for generating a customized prediction now is described. A priority for a given prediction may be established as "high." A result for the given prediction may be "Performance Center [PCHostName] will not show data in the [ReportType] report for device [DeviceName] from [StartTime] till [EndTime]" with default priority of "high." A condition for the occurrence of the given prediction may be that "Rule3 is true." Ameliorative actions associated with the prediction may include "check connection from [DeviceName]," "restarting [DeviceName]," and "backing up files from [InstallLocation]."

The prediction may be customized based on user preferences and requirements in the following manner. For example, the priority may be changed from "high" to "very high." The ameliorative action may be changed by adding one or more entry and/or removing one or more entry (e.g., removing "restarting [DeviceName]"), for example. The condition for the occurrence of the given prediction may be changed by adding a rule, such as "Rule2 is true," for example. Thus, the customized prediction may indicate a result of "Performance Center [PCHostName] will not show data in the [ReportType] report for device [DeviceName] from [StartTime] till [EndTime]" with a default priority of "high" and an actual priority of "very high" when "Rule3 is true" and "Rule2 is true." The customized prediction also may identify ameliorative actions including "checking connection from [DeviceName]" and "backing up files from [Install Location]."

Figure 6:
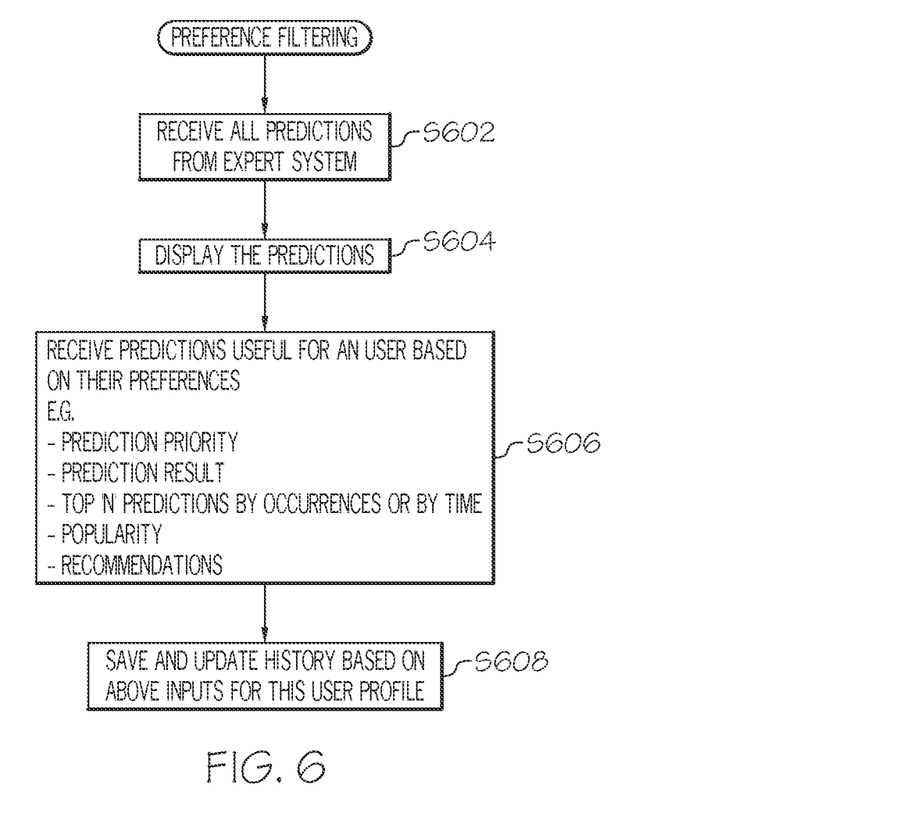
FIG. 6 illustrates a process of filtering by user preference.

Referring now to FIG. 6, a process of filtering by user preference now is described. In the process of FIG. 6, a user may specify preferences for predictions, and system 100 may customize the predictions presented to the user based on such preferences. Further, system 100 may store such preferences to be applied at a later time when additional predictions are presented to the user. User settings including user preferences may be required when an expert system is installed and/or when new users are registered to use the expert system, for example. Moreover, user preferences may be edited dynamically while the expert system is in a usage mode.

In S602, a terminal (e.g., a device 400) in communication with an expert system (e.g., a component of system 100) may receive one or more predictions from the expert system. In S604, the terminal may display the one or more predictions and permit the user to input user preferences for the displayed predictions and/or other predictions. For example, the user may specify as a preference one or more of a priority (e.g., low, medium, high) for certain predictions, important prediction results, top N criteria by occurrence and/or time, important components and/or data. Such user preferences may be provided back to system 100. In S606, system 100 may filter the predictions provided to the terminal (or the terminal may filter predictions received from the expert system directly) based on the user preferences for the current user, and the terminal may display predictions for the user based on the user's preferences. Such predictions may be arranged by, for example, prediction priority, prediction result, top N predictions by occurrence or time, by popularity, by recommendation, and/or by any other suitable criteria that is useful to the user. In S608, system 100 may save the user preferences input by the user into a history (e.g., a database such as memory 101 that may store past predictions, related statistics, and feedback from users) and update the preferences associated with the user accordingly.

Figure 7:
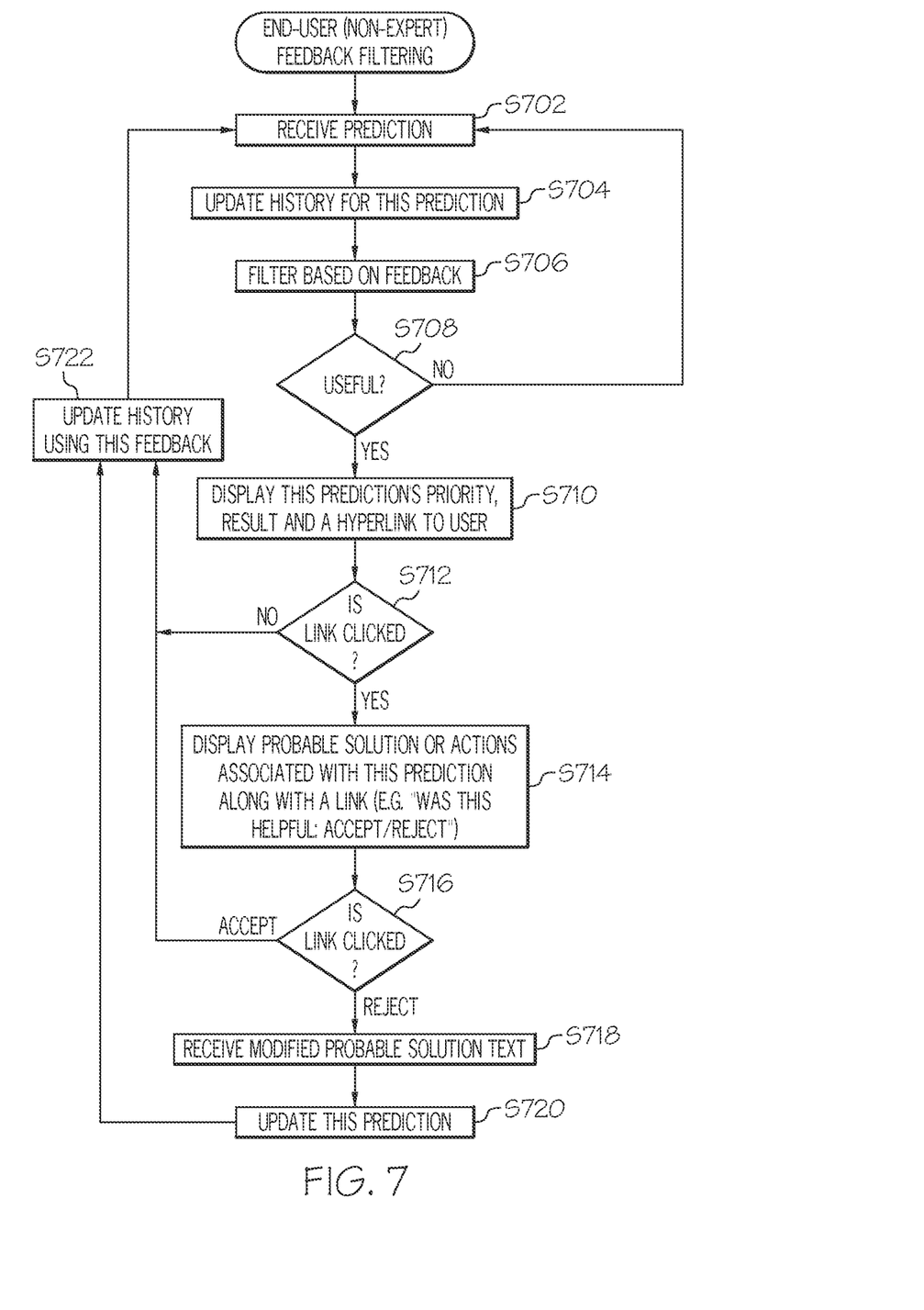
FIG. 7 illustrates a process of receiving end-user feedback and filtering.

Referring now to FIG. 7, a process of receiving end-user feedback and filtering now is described. In many instances, an end-user is not a subject matter expert and has limited understanding of the rules implemented by an expert system. For example, end-users of an expert system that monitors network infrastructure for anomalies generally are not network engineers and generally do not have a level of knowledge that is commensurate in scope with the knowledge of the expert system. Nevertheless, such end-users generally have a sound understanding of what aspects of the network are important for their roles. Consequently, certain systems and methods disclosed herein may allow one or more person who is an end user of the software application (but who may not be a human expert) to provide feedback about validity, accuracy, and usefulness of predictions. Such feedback may thereafter be stored in the history for future reference.

In S702, filter system 505 may receive one or more predictions from expert system 501. In S704, history 513 may be updated to indicate that the one or more predictions were generated by expert system 501. History 513 may associate the one or more predictions with the performance data that ultimately triggered the generation of the one or more predictions by expert system 501. In S706, filter system 505 may filter the one or more predictions based on user feedback stored in history 513, received from user 511, or otherwise obtained from other sources. Specifically, in S708, filter system 505 may determine whether the one or more predictions are useful based on the user feedback (e.g., that one or more predictions meets some threshold level of criteria established by the user feedback, that one or more predictions have a higher priority than other predictions being provided to the user). If the predictions are not determined to be useful (S708: NO), the process may return to S702 and start over. If one or more of the predictions is determined to be useful (S708: YES), the process may proceed to S710. In S710, filter system 505 may send the one or more predictions that were determined to be useful to the user (e.g., system 100 may transmit the one or more predictions to a terminal, such as device 400, for presentation to the user). The prediction may include an indication of the prediction's priority, a predicted result (e.g., a predicted anomaly), and a hyperlink that links to additional information associated with the prediction, for example.

In S712, system 100 may determine whether the aforementioned hyperlink has been activated (e.g., clicked, selected). If the hyperlink has been activated (S712: YES), the process may proceed to S714, and system 100 may cause (e.g., transmit information to) the terminal to display one or more of probable solutions for and ameliorative actions associated with the prediction. System 100 also may cause the terminal to display one or more additional hyperlink associated with a question about the usefulness of the prediction, the probable solution, and/or the ameliorative action (e.g., "Was this information helpful? Yes or No.").

In S716, system 100 may determine whether a hyperlink, which is associated with an indication that the prediction and/or related information was useful, was selected. More generally, system 100 may determine whether the user perceives the prediction (and/or information provided in association with the prediction) to be useful. If it is determined that the prediction (and/or related information) is not useful (S716: NO), system 100 may reject the prediction, and the process may proceed to S718. For example, it may be determined that the prediction (and/or related information) is not useful (S716: NO) if the user selects a hyperlink associated with an indication that the prediction and/or related information was not useful.

In S718, system 100 may obtain modified (or otherwise alternative) probable solutions for and/or ameliorative actions associated with the prediction. System 100 may provide such modified (or alternative) solutions and/or actions to the terminal for display to the user. In S720, system 100 may update the prediction such that the prediction provides the modified (or alternative) solutions and/or actions in lieu of (or at a higher priority than) the originally-provided probable solutions and/or ameliorative actions. In S722, system 100 may store the updated prediction and associated information in history 513, so that the user may receive the updated prediction when the prediction is made again or when similar predictions are made.

If, in S712, system 100 determines that the hyperlink has not been activated (S712: NO), the process may proceed to S722 without performing processes S714-S720. Similarly, if it is determined that the prediction (and/or related information) provided to the user in S714 is actually useful (S716: YES), system 100 may accept the prediction (and/or related information), and the process may proceed to S722 without performing processes S718-S720. If the prediction is not updated, in S722, system 100 may note in history 513 that the prediction and related information provided is acceptable to the user, so that the user may receive similar information when the prediction is made again or when similar predictions are made.

While the foregoing processes of FIG. 7 were described as using hyperlinks, systems and methods disclosed herein may utilize any user-interactive system for providing feedback, such as buttons, e-mails, messages, and other systems.

Figure 8:
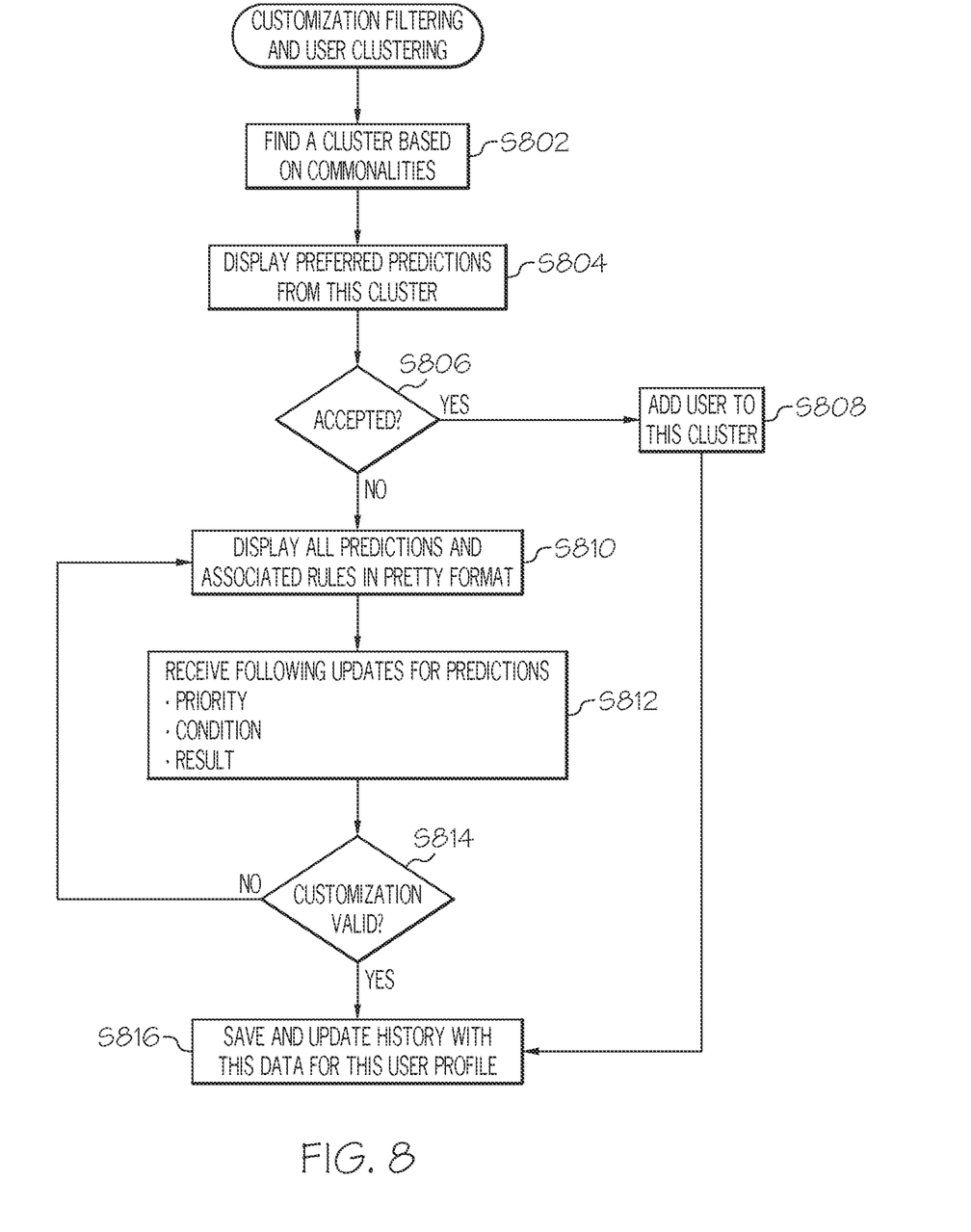
FIG. 8 illustrates a process of customization filtering and user clustering.

Referring now to FIG. 8, a process of customization filtering and user clustering now is described. Such a process may provide for customization of predictions by identifying user clusters producing modified predictions that are better-aligned with the user's needs and/or desires. Specifically, customization may allow the results extracted from an expert system to be changed dynamically and to make predictions more meaningful for users, without changing the expert system itself through a period of downtime and training. Consequently, systems disclosed herein may utilize the same core base (e.g., the same expert system rule base) but may behave differently for each user based on such user's preferences or requirements and/or based on a target environment. As used herein, a condition may refer to one or more input rules that need to be satisfied in order for a prediction to occur. Similarly, a result may refer to test or graphics that may be displayed when a prediction is generated.

In S802, system 100 may identify a cluster of users based on common attributes. Such common attributes may include, for example, one or more of historical behaviors, preferences, feedback, customizations, group affiliations, roles, authority, access rights, responsibilities, and other attributes. In particular, when a user begins interacting with system 100, system 100 may identify one or more of the user's attributes (e.g., based on identification information provided by the user, based on the user's actions, based on record information about the user) and may identify one or more users or groups of users with similar and/or identical attributes. System 100 may assign the user to a cluster with the one or more users or groups of users with similar and/or identical attributes.

In S804, system 100 may identify one or more preferred predictions (e.g., preferred priorities for certain predictions, preferred conditions for certain predictions, preferred results for certain predictions, preferred solutions and/or ameliorative actions associated with certain predictions) associated with the cluster and present the one or more preferred predictions to the user. In certain implementations, the one or more preferred predictions may be predictions that have been identified as preferred by one or more users from the cluster. In some implementations, the one or more preferred predictions may be a set of predictions that have been established as default predictions to be presented to each user of the cluster.

In S806, system 100 may present the user with an option to accept one or more of the preferred predictions as a preference for the user. More specifically, the user may select one or more of the preferred predictions associated with the cluster to be a preferred prediction for the user. In some implementations, system 100 may present the user with an option to accept all, some, or none of the preferred predictions associated with the cluster. When system 100 determines that the user has not accepted one or more of the preferred predictions associated with the cluster (S806: NO), the process may proceed to S810. When system 100 determines that the user has accepted one or more of the preferred predictions associated with the cluster (S806: YES), the process may proceed to S808.

In S808, system 100 may associate the user with the cluster. For example, if the user accepts all of the preferred predictions for the cluster, the user may be associated with the cluster and all of the preferred predictions for the cluster may be presented to the user. In some implementations, the user may still be associated with the cluster if the user accepts fewer than all of the preferred predictions. In such implementations, system 100 may note certain predictions from the preferred predictions for the cluster that may not be presented to the user, In S816, system 100 may store the association between the user and the cluster in history 513, such that the one or more preferred predictions for the cluster are presented as the preferred predictions for the user when the user subsequently receives predictions.

In S810, system 100 may display the available predictions and associated rules (e.g., not just the preferred predictions associated with the cluster) to the user in an appropriate format. In S812, system 100 may present options for the user to specify preferences for each of the available predictions. For example, system 100 may permit the user to update one or more of the priority of, the condition of, the result of, solutions for, and ameliorative actions for each of the available predictions. System 100 may receive selections of such options from the user.

In S814, system 100 may determine whether the customized preferences selected by the user are valid (e.g., compatible with the expert system, compatible with one another, available). If system 100 determines that the customized preferences are not valid (S814: NO), the process may return to S810. If the system 100 determines that the customized preferences are valid (S814: YES), the process may proceed to S816 and save the preferences selected by the user in history 513.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   receiving, by an expert system, performance data for a monitored system, the expert system storing a plurality of rules;
   generating, by the expert system, a particular prediction for the monitored system in response to determining that the performance data satisfies a first condition, the particular prediction identifying an anomaly that is predicted to occur, and the first condition including a rule from the plurality of rules;
   receiving, by a filter system, the particular prediction, information identifying the first condition, and user information, the user information including user preference information and user feedback information, the user preference information identifying preferences for predictions to be provided to the user, and the user feedback information identifying historical user feedback regarding historical predictions;
   determining, by the filter system, a filter criteria based on the user information, the filter criteria being based on the preferences for predictions to be provided to the user and on the historical user feedback regarding the historical predictions; and
   providing the particular prediction to the user in response to determining that the particular prediction satisfies the filter criteria.

2. The method of claim 1, further comprising:
   receiving, at a recommendation system, the user information;
   generating, by the recommendation system, a recommendation regarding the predictions to be provided to the user based on the user information; and
   providing the recommendation to the user with the particular prediction.

3. The method of claim 2, wherein the recommendation is a recommendation to provide a second prediction if the performance data satisfies a second condition, the second condition identifying another anomaly that is predicted to occur, the second condition including another rule from the plurality of rules, and the second prediction being indicated as a preference in preference information for another user that also indicates the particular prediction as a preference.

4. The method of claim 2, further comprising:
   receiving, at a customization system, customization information, the customization information including additional information regarding the anomaly;
   generating, at the customization system, a second condition for generating the particular prediction based on the customization information, the second condition including another rule; and
   pre-filtering the performance data based on the second condition such that the particular prediction is only received by the filter system in response to determining that the performance data satisfies the first condition and the second condition, the pre-filtering occurring before the performance data is received by the expert system.

5. The method of claim 4, wherein the other rule is one of the plurality of rules.

6. The method of claim 4, wherein the additional information regarding the anomaly identifies a precursor event that is associated with the anomaly.

7. The method of claim 4,
   wherein the customization information includes a modified priority for the particular prediction,
   wherein the user information includes the customization information, and
   wherein the filter criteria is further based on the modified priority for the particular prediction.

8. The method of claim 1, further comprising:
   providing with the particular prediction an option to input feedback about the particular prediction;
   receiving, at the filter system, the feedback about the particular prediction; and
   modifying, by the filter system, the filter criteria based on the feedback about the particular prediction.

9. The method of claim 1, further comprising:
   providing the user with a default set of user preferences as a set of user preferences for receiving predictions from the expert system, the default set of user preferences associated with a cluster of users having similar attributes;
   providing the user with an option to input modified preference information for receiving predictions from the expert system;
   receiving, at the filter system, the modified preference information; and
   modifying, by the filter system, the filter criteria based on the modified preference information.

10. The method of claim 1, further comprising:
    providing the user with a default set of user preferences and an option to accept or reject the default set of user preferences, the default set of user preferences associated with a cluster of users, and the default set of user preferences being preferences for receiving predictions from the expert system;
    associating the user with the cluster of users in response to receiving information indicating that the user accepts the default set of user preferences, such that the default set of user preferences are set as the user's preferences for receiving predictions from the expert system;
    providing the user with all predictions from the expert system, as such predictions occur, in response to receiving information indicating that the user rejects the default set of user preferences.

11. A system comprising:
    an expert system storing a plurality of rules, the expert system configured to:
    receive performance data for a monitored system; and
    generate a particular prediction for the monitored system in response to determining that the performance data satisfies a first condition, the particular prediction identifying an anomaly that is predicted to occur, and the first condition including a rule from the plurality of rules; and a filter system configured to:
receive the particular prediction, information identifying the first condition, and user information, the user information including user preference information and user feedback information, the user preference information identifying the user's preferences for predictions to be provided to the user, and the user feedback information identifying historical user feedback received from other users regarding historical predictions;
determine a filter criteria based on the user information, the filter criteria being based on the preferences for predictions to be provided to the user and on the historical user feedback regarding the historical predictions; and
provide the particular prediction to the user in response to determining that the particular prediction satisfies the filter criteria.

12. The system according to claim 11, further comprising:
a recommendation system configured to:
receive the user information;
generate a recommendation regarding the predictions to be provided to the user based on the user information; and
wherein the filter system is further configured to:
receive the recommendation; and
provide the recommendation to the user with the particular prediction.

13. The system according to claim 12, wherein the recommendation is a recommendation to provide a second prediction if the performance data satisfies a second condition, the second condition identifying another anomaly that is predicted to occur, the second condition including another rule from the plurality of rules, and the second prediction being indicated as a preference in preference information for another user that also indicates the particular prediction as a preference.

14. The system according to claim 12, further comprising:
a customization system configured to:
receive customization information, the customization information including additional information regarding the anomaly;
generate a second condition for generating the particular prediction based on the customization information, the second condition including another rule; and
pre-filter, before the performance data is received by the expert system, the performance data based on the second condition such that the particular prediction is only received by the filter system in response to determining that the performance data satisfies the first condition and the second condition.

15. The system according to claim 14, wherein the additional information regarding the anomaly identifies a precursor event that is associated with the anomaly.

16. The system according to of claim 14,
wherein the customization information includes a modified priority for the particular prediction,
wherein the user information includes the customization information, and
wherein the filter criteria is further based on the modified priority for the particular prediction.

17. The system according to claim 11, further comprising:
a recommendation system configured to provide an option to input feedback about the particular prediction,
wherein the filter system is further configured to:
receive the feedback about the particular prediction; and
modify the filter criteria based on the feedback about the particular prediction.

18. The system according to claim 11, further comprising:
a recommendation system configured to:
provide the user with a default set of user preferences as a set of user preferences for receiving predictions from the expert system, the default set of user preferences associated with a cluster of users having similar attributes; and
provide the user with an option to input modified preference information for receiving predictions from the expert system;
wherein the filter system is further configured to:
receive the modified preference information; and
modify the filter criteria based on the modified preference information.

19. The system according to claim 11, further comprising:
a recommendation system configured to:
provide the user with a default set of user preferences and an option to accept or reject the default set of user preferences, the default set of user preferences associated with a cluster of users, and the default set of user preferences being preferences for receiving predictions from the expert system;
associate the user with the cluster of users in response to receiving information indicating that the user accepts the default set of user preferences, such that the default set of user preferences are set as the user's preferences for receiving predictions from the expert system;
wherein the filter system is further configured to:
provide the user with all predictions from the expert system, as such predictions occur, in response to receiving information indicating that the user rejects the default set of user preferences.

20. A computer program product comprising:
a computer readable storage medium having computer readable program code embodied therewith, the computer readable program code comprising:
computer readable program code configured to implement the processes of an expert system storing a plurality of rules, the expert system configured to:
receive performance data for a monitored system;
generate a particular prediction for the monitored system in response to determining that the performance data satisfies a first condition, the particular prediction identifying an anomaly that is predicted to occur, and the first condition including a rule from the plurality of rules; and
computer readable program code configured to implement the processes of a filter system, the filter system configured to:
receive the particular prediction, information identifying the first condition, and user information, the user information including user preference information and user feedback information, the user preference information identifying preferences for predictions to be provided to the user, and the user feedback information identifying historical user feedback regarding historical predictions;
determine a filter criteria based on the user information, the filter criteria being based on the preferences for predictions to be provided to the user and on the historical user feedback regarding the historical predictions; and provide the particular prediction to the user in response to determining that the particular prediction satisfies the filter criteria.

* * * * *